J. GEHR.
Hominy Huller.
No. 29,159.
Patented July 17, 1860.
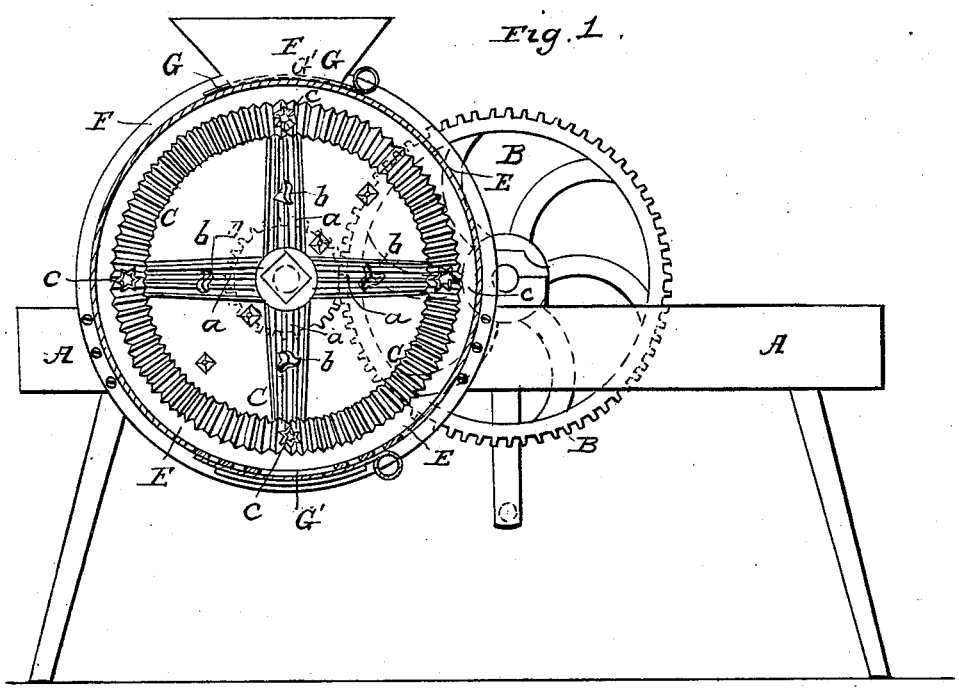
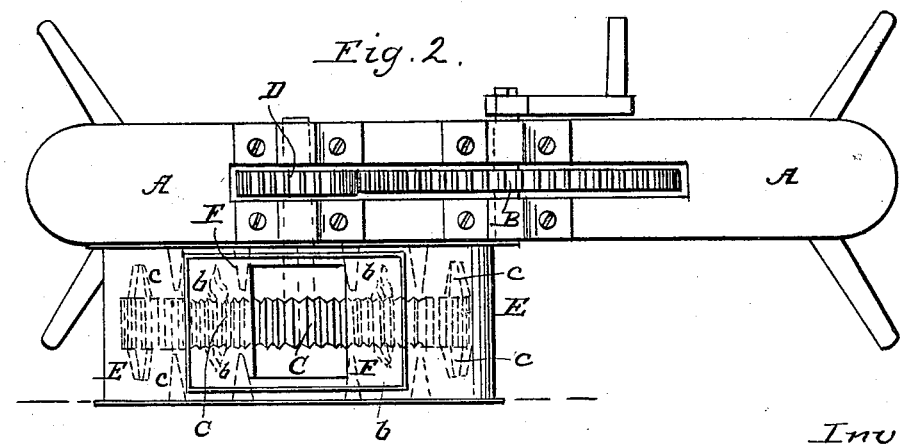

UNITED STATES PATENT OFFICE.

JOHN GEHR, OF CLEAR SPRING, MARYLAND.

HOMINY-MACHINE.

Specification of Letters Patent No. 29,159, dated July 17, 1860.

*To all whom it may concern:*

Be it known that I, JOHN GEHR, of Clear Spring, in the county of Washington and State of Maryland, have invented a new and Improved Hominy-Huller; and I do hereby declare that the following is a full, clear, and exact description thereof, reference being had to the accompanying drawings, making a part of this specification, in which—

Figure 1 represents a side elevation of the machine, and a section through the hulling box. Fig. 2 is a plan view of the machine.

Similar letters of reference indicate corresponding parts in both figures.

This invention is an improvement in mechanism for removing the hulls from ground corn, or wheat, commonly called hominy.

It consists in the employment of a large wheel with a quadrangular rim having its entire surface grooved or ribbed, and having projecting from its surfaces ribbed spikes, that, with the wheel, when it is arranged in a large drum, having spikes projecting from its inside side surfaces, and rotated very rapidly will thoroughly stir the hominy and take off the outer shells by attrition, or by the peculiar action the ribbed surfaces will have upon the broken grains. The wheel being arranged within a cylindrical box having perforations in its bottom; the hulls &c., will escape through these perforations leaving the pure hominy in the box, from which it may be removed at any time by a sliding door, all as will be hereinafter described and represented.

To enable those skilled in the art to fully understand my invention, I will proceed to describe its construction and operation.

In the drawing, A, represents a table mounted on four legs, and carrying a large wheel, B, to the shaft of which a crank handle is attached for operating the wheel which engages with the teeth of a pinion spur wheel, D, whose shaft is continued out from one side of its bearings, and receives on it a large wheel, C, which is inclosed within a cylindrical box, E, having a hopper, F, on top of it, and a perforated sliding gate, G. The bottom part of this cylindrical drum E, is perforated and provided with another sliding gate, G'. This drum is secured rigidly to the side of the table A, while the large wheel, C, is made to rotate within it. The peculiarity of this wheel, C, is that its entire surface—spokes included— is ribbed with angular projections.

The rim of the wheel is quite large and quadrangular, and its four surfaces are grooved laterally and radially in the manner represented in Figs. 1 and 2. The spokes, $a$, $a$, are also grooved in a direction with their length. $b$, $b$, are twisted spikes that project from the sides of the wheel, C; and $c$, $c$, are straight spikes that also project from the sides of the wheel, C; and are placed at regular intervals apart. These spikes with those projecting from the sides, inside of the drum, serve as stirrers to keep the cracked corn in a state of agitation when the wheel, C, is rotated. These rotating, serrated surfaces have the effect of rubbing off from the broken grains of corn their scale or hull without further breaking up the corn, while the arms keep the entire mass in constant agitation, so that it will be thoroughly submitted to the hulling surfaces of wheel, C. This wheel, C, performs another important office in the operation of the machine; viz., that of a fly or balance wheel to regulate and to render the motion of the parts uniform, and thus enabling the application of power, to move the wheel, to a great advantage.

Having thus described my invention, what I claim as new and desire to secure by Letters Patent, is—

The wheel, C, having spikes projecting from its side surfaces, and having its entire surfaces, spokes and all, serrated or ribbed in the manner set forth, when the same is arranged within a drum, E, with spikes projecting from its sides, inside, the whole being arranged in the manner and for the purposes herein set forth.

JOHN GEHR.

Witnesses:
    B. BRIDENDOLPH,
    SAMUEL L. TABLER.